July 31, 1956  J. SANON  2,757,057
PISTON RING
Filed Feb. 18, 1953
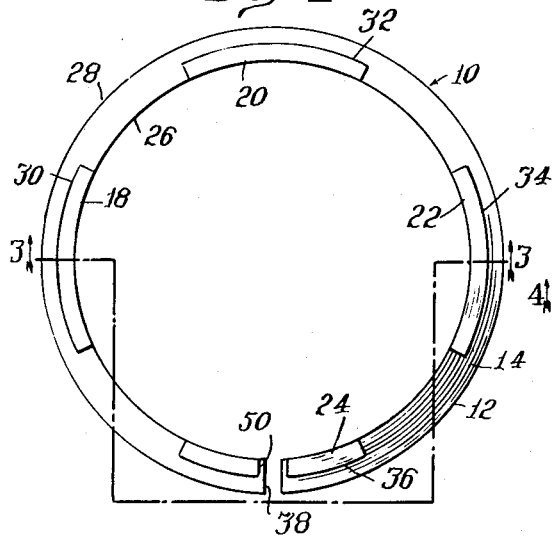
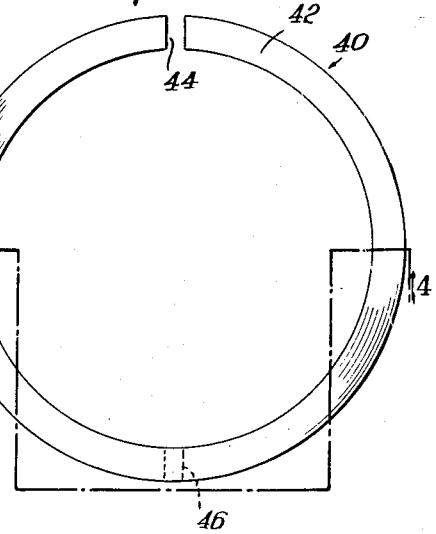
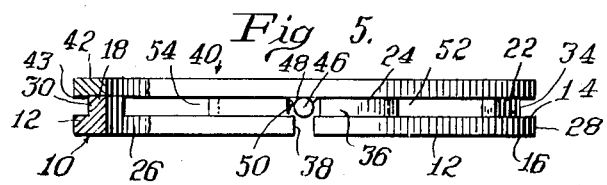
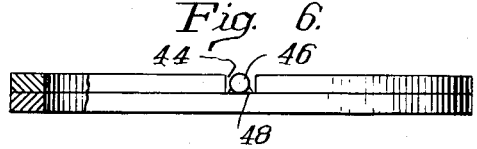
INVENTOR
Joseph Sanon
BY *Munn, Liddy & Nathanson*
ATTORNEYS United States Patent Office 2,757,057
Patented July 31, 1956

2,757,057
PISTON RING

Joseph Sanon, New Philadelphia, Ohio

Application February 18, 1953, Serial No. 337,612

1 Claim. (Cl. 309—44)

This invention relates to improvements in piston rings and particularly to a composite type piston ring for internal combustion engines. Piston rings of many types are available on the market today. Each of the piston rings are said to have particular characteristics. However, the large number of different types of rings and the variance in construction serves only to illustrate that as yet truly satisfactory piston rings have not been developed. It is not uncommon with the modern high speed engines to find that a considerable quantity of oil is "burned" after a relatively few thousand miles, and that compression losses occur much sooner than they were expected. It is accordingly an object of this invention to provide piston ring construction such that an extended period of satisfactory service is obtained.

Some oil and compression rings that have been developed do provide a seemingly remarkable degree of efficiency. Soon after these rings are placed in an engine oil consumption is reduced to an absolute minimum and compression is restored even where cylinder walls are pitted and scored. However, after a relatively short period of use the same old troubles begin to reoccur. Such rings are so constructed that they will, in effect, grind away the cylinder walls to reduce the size of pits and other indentations of the cylinder walls. This is accomplished, yet the rings continue to wear away the cylinder walls beyond the point of peak efficiency and heavy oil consumption soon again occurs. It is, therefore, a further object of this invention to provide ring construction with which an extended period of high efficiency of operation is obtained, and with which the cylinder walls are not damaged.

Of the rings which have been developed, many as pointed out above, are not satisfactory, and some of them which are satisfactory actually produce an excessive amount of cylinder wear. Others which are satisfactory are extremely high-priced as compared to the average rings. This deters their ready acceptance. Another object of my invention is to provide a low cost ring construction. A properly functioning oil ring is essential to proper performance. Oil rings often do not have adequate oil passages and also become clogged in service. As a result, excessive amounts of oil remain on the cylinder walls where it is burned, or at least volatilized during firing. An oil ring construction in accordance with my invention has adequate oil passages and will not clog.

These and other objects and advantages will become apparent from the following description and the accompanying drawing, in which:

Figure 1 is a plan view of one element of a two element oil ring;

Figure 2 is a plan view of the second element of the oil ring;

Figure 3 is a sectional elevational view of the ring of Figure 1, taken along lines 3—3;

Figure 4 is a sectional view of the ring of Figure 2 taken along line 4—4;

Figure 5 is an elevational view partly in section showing the ring elements of Figure 1, and Figure 2, as they appear when the completed oil ring is formed.

Figure 6 is an elevational view partly in section showing a compression ring formed by combining two of the elements shown in Figure 2.

Similar reference characters in the several figures indicate similar elements.

A ring constructed in accordance with my invention comprises two separable elements, one of which is adapted to overlie the other. The separate elements have an interlocking relationship. The element 10 shown in Fig. 1, can be referred to as the bottom element, and comprises a generally circular shaped base 12 which is substantially flat on its upper and lower surfaces 14 and 16, respectively. On its upper surface 14 there are equally spaced flanges 18, 20, 22 and 24 extending vertically upward. At the inner edges the flanges are coextensive with the inner side 26 of base 12. The outer curved edges of the upstanding projections or flanges are offset from the outer edge 28 a substantial distance and are concentric with said outer edge. The upper surface of flanges 18, 20, 22 and 24 lie in a single plane parallel to the planes of upper and lower surfaces 14 and 16.

As shown, the distance between the outer edge 28 and the outer edges 30, 32, 34 and 36 of the projections is approximately half the total distance radially across the upper surface 14. Ring element 10 is slotted as at 38 as is common with piston rings.

The upper element 40 comprises a cylindrical ring having an upper surface 42 and a lower surface 43. The outer diameter of ring 40 and its inner diameter are the same as the outer diameter and the inner diameter respectively of element 10. Ring 40 is cut out as at 44 for expansion. Slots 38 and 44 have vertical side walls.

Diagonally opposite the cut-out portion 44 there is provided a cylindrical lock pin 46. The lock pin 46 extends radially across upper element 40. The pin is mounted on the lower surface of ring 40, as illustrated in Fig. 4, and is attached to ring 40 by any suitable means, such as by welding 48.

Figure 5 illustrates the manner in which the two elements 10 and 40 are combined to form an oil ring. The lower element 10 and upper element 40 are shown as they would normally appear when mounted in a ring groove.

Lock pin 46 extends downwardly into the cut-out opening 38 of ring element 10. It should be noted that lock pin 46 cooperates with the opening provided in flange 24 and does not extend downwardly into the base 12 of element 10. Obviously, however, the lock pin may be formed of a shape and dimensioned such that it would extend down into the base.

In order to provide for proper expansion the opening or slot 38 may be stepped with a larger opening 50 being provided between the adjacent ends of the two portions of flange 24. By so doing adequate clearance for receipt of the lock pin 36 is provided, and yet the base 12 will close properly after a warm-up period. However, such is not necessary, and slots 38 can be of uniform size throughout.

With the two elements 40 and 10 assembled, oil passageways are formed intermediate element 40 and base 12 by the flanges 18, 20, 22 and 24. Such oil passageways are indicated by reference numerals 52 and 54. The passageways are of considerable extent and provide adequate openings for the flow of oil inwardly to the piston and through the piston ports.

It should be noted that the distance between the outer edge 28 and the outer edges of the projections or flanges 18, 20, 22 and 24 is approximately half the radial distance across the base 12. Thus, a chamber for the ingress of oil into the ring extends completely around the composite oil ring of Fig. 5.

Every portion of the cylinder wall of an engine will be provided throughout the whole stroke with a passageway or opening for the transfer of oil from the cylinder wall down to the oil pan. There are no portions of the cylinder wall which will not be properly scraped by the oil ring. The locking pin 46 serves to prevent undesirable rotation between the ring elements 10 and 40.

Figure 6 shows a composite compression ring formed by utilizing two of the rings or elements 40. As shown, the rings are placed one above the other with the locking pin 46 of one ring element extending upwardly into the slot 44 of the other element, and the locking pin of the latter element extending downwardly into the slot of the first mentioned element. There is thus provided a composite compression ring desirable for use in cylinders where there has been pitting or similar excessive wear. The slots 44 may be made of sufficient size to accommodate the locking pins 46 and permit the required expansion of the rings.

With both constructions of rings illustrated in Figs. 5 and 6, a substantially leak-proof ring is provided.

While I have shown and described a preferred form of my invention, it will be understood that variations in details of form may be made without departure from the invention as defined in the appended claim.

I claim:

A composite piston ring comprising an upper and a lower element, said lower element comprising a base generally circular in shape, equally spaced flanges extending upwardly from said base and having upper surfaces lying in a single plane, the latter plane extending parallel to the upper surface of said base, the outer surface of said base being cylindrical in shape, each of said flanges having outer surfaces spaced inwardly from the outer surface of said base approximately half the radial distance across the upper surface of said base, and the outer surfaces of said flanges being concentric with the outer surface of said base, said upper element comprising a flat ring having parallel upper and lower surfaces, and an outer surface alined with the outer surface of said base, said upper element having a slot formed therein and a cylindrical lock pin secured to one side thereof and extending radially of said upper element and downwardly therefrom, said lower element having a slot extending through the base and one of said flanges, said slot being formed with facing vertical surfaces, said lock pin being positioned in the last named slot between said facing vertical surfaces, and the lower surface of said upper element lying on the upper surface of said flanges.

References Cited in the file of this patent

UNITED STATES PATENTS

| | | |
|---|---|---|
| 1,094,057 | Chevrolet | Apr. 21, 1914 |
| 1,120,022 | Campbell | Dec. 8, 1914 |
| 1,133,672 | Simons | Mar. 30, 1915 |
| 1,413,409 | Lackman | Apr. 18, 1922 |
| 1,476,657 | Tawney | Dec. 4, 1923 |
| 1,549,104 | Bergeron | Aug. 11, 1925 |
| 2,073,500 | Sopp | Mar. 9, 1937 |
| 2,183,199 | Lutz | Dec. 12, 1939 |
| 2,260,612 | Fall | Oct. 28, 1941 |
| 2,278,019 | Phillips | Mar. 31, 1942 |

FOREIGN PATENTS

| | | |
|---|---|---|
| 706,076 | France | Mar. 23, 1931 |
| 826,487 | France | Mar. 31, 1938 |
| 907,670 | France | Mar. 19, 1946 |